US009106564B2

(12) United States Patent
Marr

(10) Patent No.: US 9,106,564 B2
(45) Date of Patent: Aug. 11, 2015

(54) INCREMENTAL HIGH RADIX NETWORK SCALING

(75) Inventor: Michael David Marr, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 289 days.

(21) Appl. No.: 13/077,636

(22) Filed: Mar. 31, 2011

(65) Prior Publication Data

US 2012/0250574 A1 Oct. 4, 2012

(51) Int. Cl.
*H04L 12/933* (2013.01)
*G02B 6/35* (2006.01)
*H04Q 11/00* (2006.01)

(52) U.S. Cl.
CPC ............. *H04L 49/15* (2013.01); *G02B 6/354* (2013.01); *H04Q 2011/0052* (2013.01)

(58) Field of Classification Search
CPC .. G02B 6/356; G02B 6/02042; G02B 6/3512; G02B 6/3556; H04L 12/4633; H04L 12/6418; H04L 29/12028; H04L 29/12047; H04L 29/12056; H04L 41/0896; H04L 45/16; H04L 45/24; H04L 47/125; H04L 49/65; H04L 49/356; H04L 61/15; H04L 61/103; H04L 61/1505; H05K 7/1498; H04Q 3/68; H04Q 2213/1304; H04Q 2213/13076; H04Q 2213/13141; H04Q 2213/13341; H04Q 2213/13
USPC .......................... 370/254, 310, 351, 352, 431
See application file for complete search history.

(56) References Cited

U.S. PATENT DOCUMENTS

| | | | |
|---|---|---|---|
| 2003/0185225 A1 | 10/2003 | Wirth et al. | |
| 2004/0056757 A1 | 3/2004 | Konda | |
| 2006/0106922 A1* | 5/2006 | Arregoces et al. | 709/223 |
| 2010/0254652 A1 | 10/2010 | Kirkpatrick et al. | |
| 2010/0254703 A1* | 10/2010 | Kirkpatrick et al. | 398/45 |
| 2010/0265849 A1 | 10/2010 | Harel | |
| 2011/0087799 A1* | 4/2011 | Padhye et al. | 709/235 |

FOREIGN PATENT DOCUMENTS

WO WO 2006033650 A1 * 3/2006

OTHER PUBLICATIONS

"PCT International Search Report dated Jul. 3, 2012", PCT Application No. PCT/US12/031117, 7 pages.

* cited by examiner

*Primary Examiner* — Alpus H Hsu
*Assistant Examiner* — Dharmesh Patel
(74) *Attorney, Agent, or Firm* — Hogan Lovells US LLP

(57) ABSTRACT

Efficient and highly-scalable network solutions are provided that utilize incremental scaling of switches, and devices connected to those switches, in an environment such as a data center. Embodiments may utilize multiple tiers of switches. Sets of switches in two different tiers may be initially connected to each other utilizing multiple connections. As network capacity needs within the computing environment increase, additional switches may be added to tiers. To connect the added switches to the switch network, the redundant connections may be utilized. Moving connections from one switch to another switch can free up ports to connect added switches in one of the tiers of switches to the switch network. The tiers of switches can be based on Clos networks, where the tiers of switches are fully connected, or other high radix or fat tree topologies that include oversubscription between tiers.

23 Claims, 11 Drawing Sheets

INCREMENTAL HIGH RADIX NETWORK SCALING

BACKGROUND

As an increasing number of applications and services are being made available over networks such as the Internet, and increasingly utilizing sources such as networked data centers, an increasing number of content, application, and/or service providers are turning to technologies such as cloud computing and Web services. In such environments, the hardware and/or software used to provide access to data and/or electronic resources typically needs to be scalable to meet the needs of various users at any given time. A user or customer typically will rent, lease, or otherwise pay for access to resources, and thus does not have to purchase and maintain the hardware and/or software to provide access to these resources.

Various approaches exist that enable resources such as data centers and Internet-Protocol (IP)-based networks to scale as the needs of the various users and applications increase. In some cases, this requires the purchase of large, expensive hardware that typically provides more capacity than is immediately necessary. In other cases, less expensive hardware devices can be used, but in order to handle conventional routing protocols the number of devices needed to scale can be quite large and complex to install. For a large number of resources to be provided, this can provide a significant expenditure and overhead, which can be undesirable in many instances.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to connecting resources in an environment such as a data center, compute cloud, or Internet Protocol (IP)-based network. In particular, various embodiments utilize groups or tiers of network switches and/or other networking devices that can be incrementally scaled up over time based on capacity needs for the network or data center. The network can include multiple tiers of switches. Adjacent tiers of switches can be initially connected using redundant connections between respective switches in the adjacent tiers. As additional capacity is needed, additional switches may be added to the tiers of switches. The redundant connections may be disconnected from switches in one of the tiers and reconnected to the additional switches in that tier. By performing this process one switch or port at a time, the impact on link bandwidth in the network can be minimized. The process also can open up ports on the switches that have had a connection disconnected from a respective switch; these ports may be utilized in part to connect the additional switches in the adjacent tier of switches. The tiers of switches can be based on a Clos network topology, where the tiers of switches are fully connected. Other high radix or fat tree network topologies will also find application herein.

Various other advantages and implementations are possible as discussed and suggested below with respect to the various embodiments.

Figure 1:
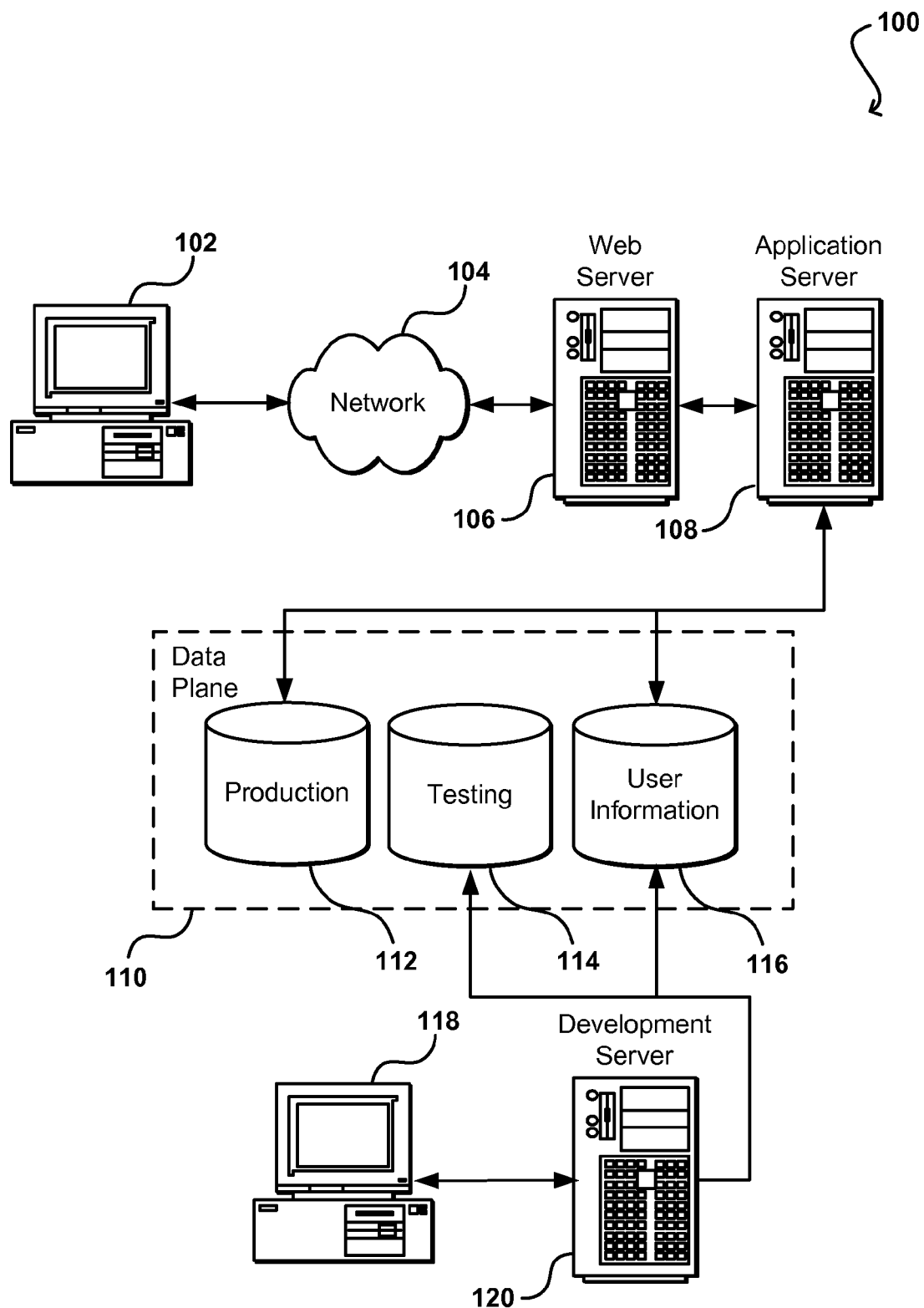
FIG. 1 illustrates an environment in which various embodiments can be implemented.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include data center servers, workstations, personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or computing device as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

An environment such as that illustrated in FIG. 1 can be useful for an electronic marketplace or compute cloud, for example, wherein multiple hosts might be used to perform tasks such as serving content, executing large-scale computations, or performing any of a number of other such tasks. Some of these hosts may be configured to offer the same functionality, while other servers might be configured to perform at least some different functions. The hosts can be grouped together into clusters or other functional groups for the performance of specific tasks, such as may be provided as part of a data center, cloud computing offering, or processing service. The electronic environment in such cases might include additional components and/or other arrangements, such as those illustrated in the configuration 200 of FIG. 2, discussed in detail below.

Figure 2:
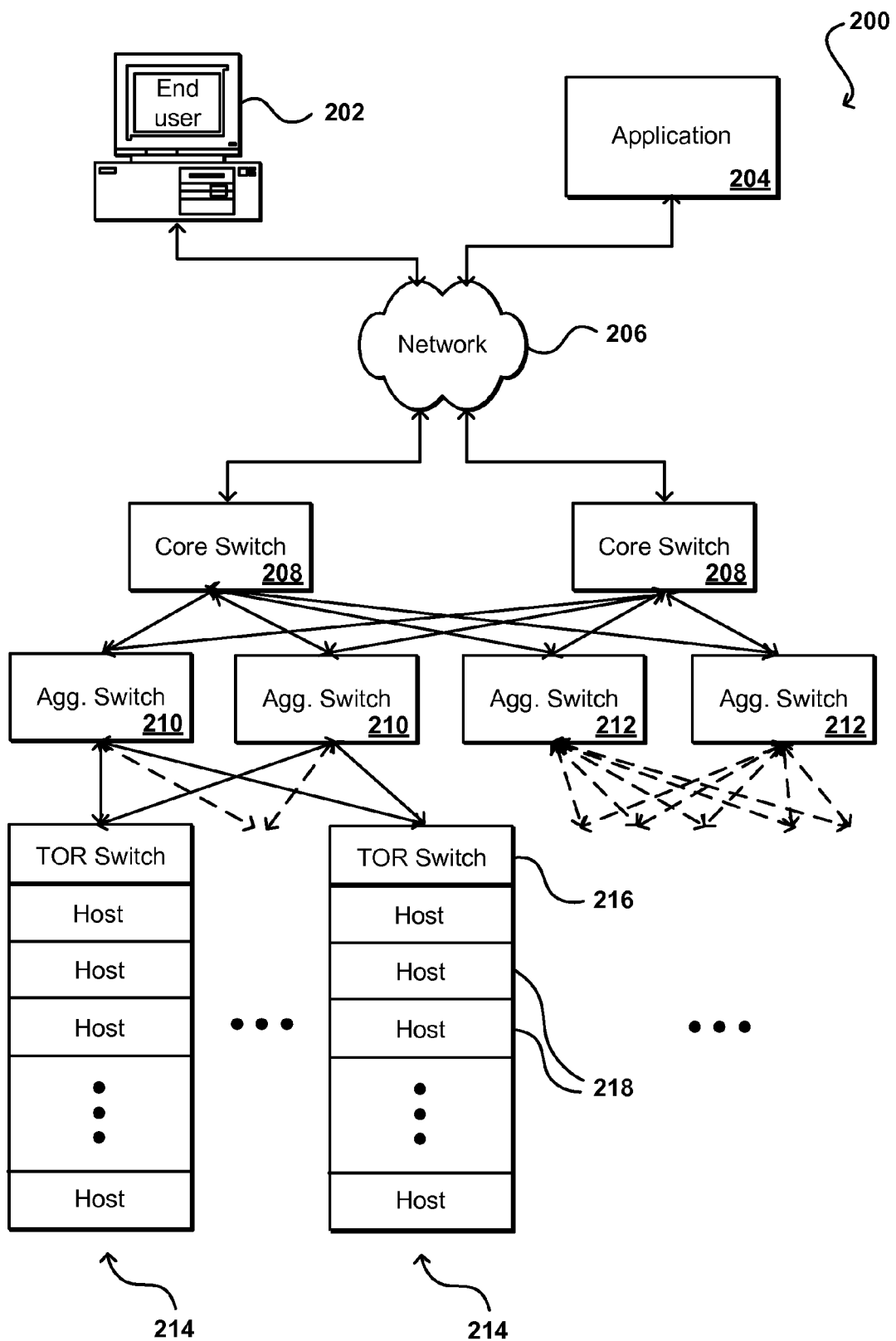
FIG. 2 illustrates an example of a highly connected network design that can be used in accordance with various embodiments.

For example, FIG. 2 illustrates an example configuration 200 that represents a traditional hierarchical network design that can be used to route requests to specific host machines or other such devices, in order to provide users or applications with access to a variety of distributed resources. This example shows a typical design that can be used for a data center, wherein a source such as an end user device 202 or application 204 is able to send requests across a network 206, such as the Internet, to be received by one or more components of the data center. Properties of various components of the network, such as provisioned instances, etc., can be managed using at least one management system, component, or service 220. In this example, the requests are received over the network to one of a plurality of core switches 208, but it should be understood that there can be any of a number of other components between the network and the core switches as known in the art. As traditional differentiators have substantially disappeared, the terms "switch" and "router" can be used interchangeably. For purposes of clarity and explanation this document standardizes on the term "switch," but it should be understood this term as used also encompasses routers and other devices or components used for such purposes. Further, the switches can include any appropriate switch, such as a multilayer switch that operates at different levels in an OSI (Open System Interconnection) reference model.

As illustrated, each core switch 208 is able to communicate with each of a plurality of aggregation switches 210, 212, which in at least some embodiments are utilized in pairs.

Utilizing aggregation switches in pairs provides a redundant capability in case one or the switches experiences a failure or is otherwise unavailable, such that the other device can route traffic for the connected devices. Each pair of aggregation switches 210, 212 is linked to a plurality of physical racks 214, each of which typically contains a top of rack (TOR) or "access" switch 216 and a plurality of physical host machines 218, such as data servers and other processing devices. As shown, each aggregation switch can be connected to a number of different racks, each with a number of host machines. The links between the layers can each comprise redundant links, or link pairs, with separate links for inbound and outbound traffic. If the network utilizes redundant 1 Gigabit Ethernet (GbE) links, for example, the total bandwidth per redundant link is 2 GbE.

As an additional benefit, the use of aggregation switch pairs enables the capability of a link to be exceeded during peak periods, for example, wherein both aggregation switches can concurrently handle and route traffic. Each pair of aggregation switches can service a dedicated number of racks, such as 120 racks, based on factors such as capacity, number of ports, etc. There can be any appropriate number of aggregation switches in a data center, such as six aggregation pairs. The traffic from the aggregation pairs can be aggregated by the core switches, which can pass the traffic "up and out" of the data center, such as back across the network 206. In some embodiments, the core switches are provided in pairs as well, for purposes including redundancy.

In some embodiments, such as high radix interconnection networks utilized for high-performance computing (HPC) or other such purposes, each physical rack can contain multiple switches. Instead of a single physical TOR switch connecting thirty-six hosts in a physical rack, for example, each of three switches in the rack can act as a local TOR switch for a "logical" rack (a sub-rack of a physical rack or logical grouping of devices (hosts and/or switches) from multiple racks), with each local TOR switch connecting twelve of the host machines. The logical racks can be implemented using physical or wireless switches in different embodiments. In some embodiments each of these switches within a high performance computing rack manages up to twelve servers, but the number can vary depending on factors such as the number of ports on each switch. For example, if a switch contains twenty-four ports, half of those ports typically will be host-facing and the other half will face the external network. A design in accordance with one embodiment could utilize seven racks with three switches in each, with each local TOR switch communicating (redundantly) with twelve servers, which would generally be equivalent to twenty-one separate racks each with a single TOR switch communicating with twelve servers, for example. In subsequent figures and description, it should be understood that physical or logical racks can be used within the scope of the various embodiments.

Figure 3A:
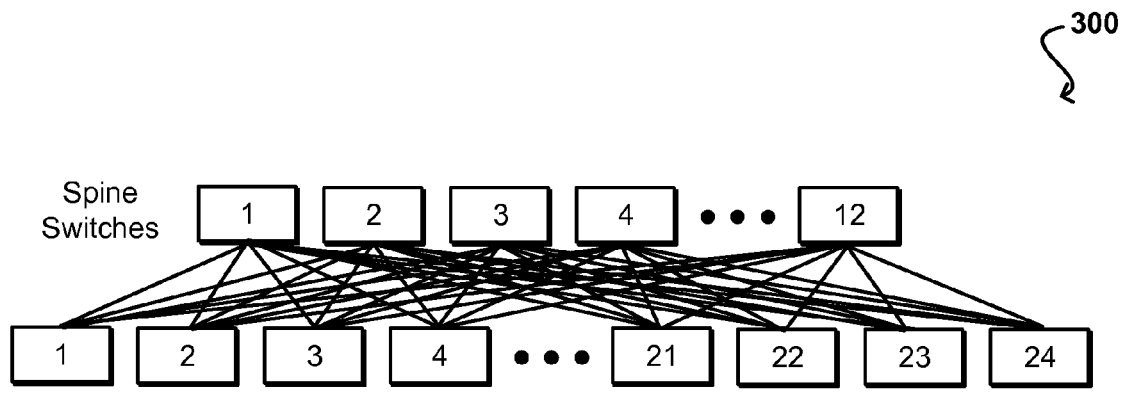
FIGS. 3(a) and 3(b) illustrate views of a Clos-network style that can be utilized in accordance with various embodiments.
Figure 3B:
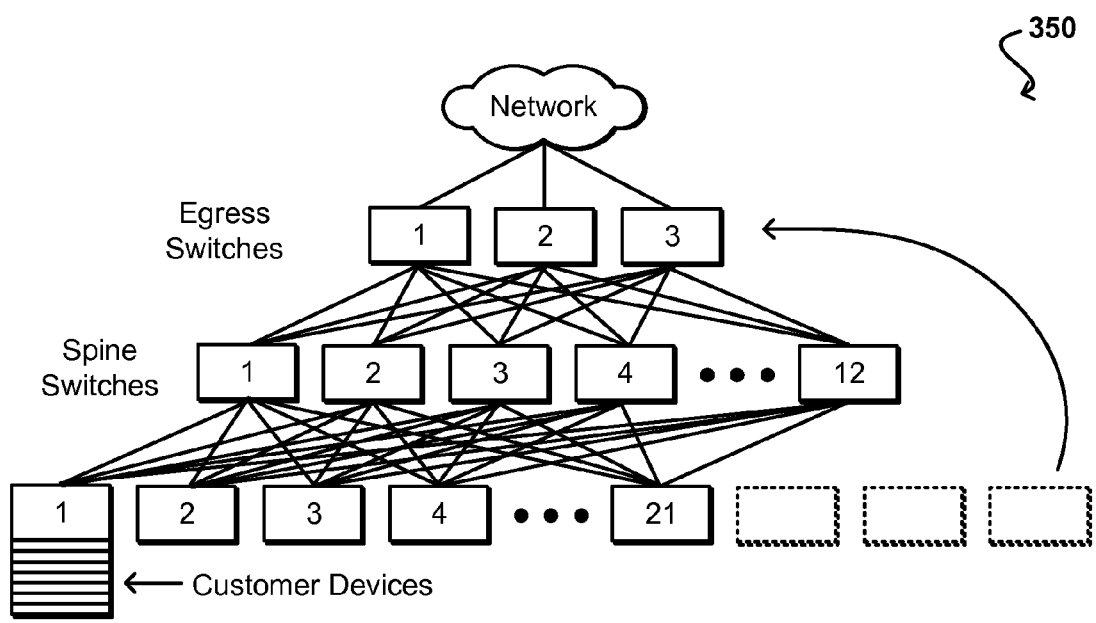

The connectivity approach used for such a network can vary between embodiments. For example, FIGS. 3(a) and 3(b) illustrate a design based on a Clos network topology approach, wherein there are twenty-one racks each with at least one TOR switch, and each of the TOR switches is connected to an array of twelve spine switches, which typically will be located in another physical rack. The array of spine switches corresponds to a "center" stage in a traditional Clos network design. Since there are twelve hosts, there are twelve "up" connections and twelve "down" connections to the spine switches. The design thus provides a high radix network based on a re-arrangeably non-blocking Clos network.

The design presented illustrates a two-tier folded Clos network. As seen in the configuration 300 of FIG. 3(a), there are effectively two layers of switches: a layer of spine switches and a layer of edge switches. Three of the edge switches, however, can be utilized as egress switches which pass data on to the network. FIG. 3(b) thus illustrates a logical arrangement 350 of the switches, which may be referred to as a deployment unit, showing the three edge switches as egress switches which sit at the "top" of the group of switches and pass data "up and out" of the deployment unit. Each of the twelve spine switches can be thought of as having a port out the logical "back" side to one of the three egress switches, but the three switches are simply one of the twenty-four edge servers illustrated in a folded representation. The egress switches simply have the only connections out of the deployment unit, while the remaining edge switches have connections to underlying devices. All traffic into and out of the deployment unit thus is routed through one of the three egress switches, although different numbers of switches can be used in different embodiments.

Even though the network may appear similar to the traditional core switch-based design of FIG. 2, the spine switches in this design function as core switches, but do not have any outbound connectivity. The layers of the deployment unit have fully meshed connectivity, however, provided by the spine switches. The deployment unit without the egress switches would function as a standalone network without any external connectivity. Thus, some of the edge switches can be utilized as egress switches as illustrated. Otherwise, the fact that some of the edge switches are illustrated on the top layer and some on the bottom layer is meaningless from a network connectivity perspective with respect to the spine switches and the other edge switches, and there is very symmetric behavior. The data within the deployment unit can be pushed through a number of equidistant, fault-tolerant paths, providing the re-arrangably non-blocking behavior. With the paths being symmetric and equidistant, all the switches can follow the same routing protocol and spread the traffic evenly without a lot of overhead or additional logic. Further, the deployment units can be replicated multiple times within a data center, for example, wherein a Clos-style network effectively manages traffic across all of the deployment units in the data center.

An advantage of a high radix network or similar fat tree design is that the network can easily be scaled by adding additional deployment units, each connected using an aggregation fabric such as is described with respect to FIG. 2. A potential downside, however, is that the number of devices needed to scale the deployment units can increase very quickly, which can significantly increase the cost of the network. In an example where large data switches in a network are replaced with a design utilizing commodity switches in a high radix or other such implementation, the number of devices increases from around fifteen switches to on the order of seven hundred to eight hundred switches. Commodity switches as used herein generally refer not only to mass-produced, off-the-shelf switches, but also refer to switches built by low cost Just-In-Time (JIT) or on-demand manufacturers, typically using "merchant silicon" or other relatively low-cost materials. Commodity switches typically are relatively simple, although more complex proprietary switches can be included as well.

Replacing the large switches with a number of smaller commodity switches in this example, however, increases the number of Layer 3 switches that speak the appropriate routing protocol on the order of about fifty times in one embodiment. Further, each of the switches will have to obtain information about all the other switches in the data center, as well as information about all the host devices connected to those switches, such that the amount of information that each switch needs to obtain and process is much higher than in certain conventional designs. Thus, while a high radix interconnection network provides advantages such as ease of scalability and high bandwidth capability, as well as a chance for significant cost savings, the complexity of the routing protocol grows on the order of $n^2$ for a two-tier Clos-based network design, and on the order of $n^4$ for a three-tier Clos-based network, where n is the number of ports on the devices used in each tier. For a large number of hosts, this can provide a significant expenditure and overhead, which can be undesirable in many instances.

Figure 4A:
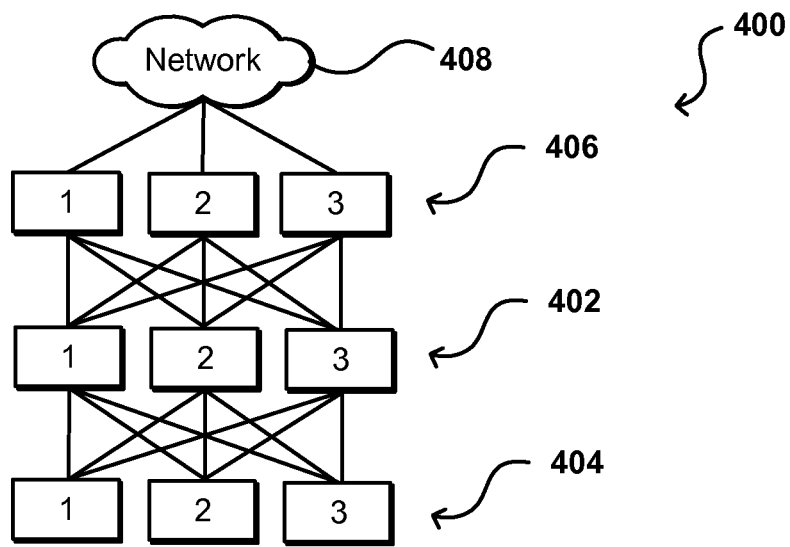
FIGS. 4(a) and 4(b) illustrate Clos-based network groups with different levels of oversubscription that can be used in accordance with various embodiments.

FIG. 4(a) illustrates a traditional three-stage, two-tier Clos network configuration 400 in an "unfolded" view, similar to that shown in FIG. 3(b), here based on six-port switches wherein there are half the number of spine switches 402 as there are edge 404 or "leaf" switches, and wherein half of the edge switches function as egress switches 406. The Clos network is highly connected, as each device in each stage is connected to each device in an adjacent stage. The devices of both tiers thus are fully connected, with no intra-tier connections within a stage (or tier). If all the available ports on all the edge switches were used to make host connections, there would be no connection out of the Clos network. Thus, as discussed previously, connections to an external network 408 typically would be made using the available ports of the egress switches 406. In some cases, at least some of the egress switches are used to connect to devices that sit between the Clos network and the external network, such as a set of core routers and/or an aggregation fabric. As can be seen, however, the tier 2 devices (here spine switches) never make connections to anything but tier 1 devices (here edge or egress switches). Thus, in order to route host traffic out to the external network, the host would communicate with an edge switch, which would communicate to a spine switch, which would communicate with an egress switch, which would pass the communication to the external network. The three communications correspond to the three stages of the Clos network. As should be understood, there can be any appropriate number of tiers in a Clos network using any appropriate type of switches, such as twelve, twenty-four, or forty-eight port switches. The number of devices in each tier can depend at least in part upon the number of ports, as a traditional Clos is fully connected and non-blocking, and does not have oversubscription at any tier. While figures with limited numbers of devices are shown for purposes of simplicity and explanation, it should be understood that the basic concepts apply and scale accordingly.

A potential downside to conventional Clos networks is that the networks can be very expensive to scale due to factors such as full connectivity and 1:1 oversubscription. For devices with many ports, there will be many more spine switches that must connect to each of the edge and egress devices. By not having any oversubscription at any level, the overhead (e.g., based on the number of switches) per host device can be prohibitively large. The efficiency of a data center can be measured in one respect by comparing the number of available host connections to the number of devices used to provide the networking fabric. Another efficiency measurement looks at the network costs (e.g., based on the number of cables and switches) per number of host connections available.

Figure 4B:
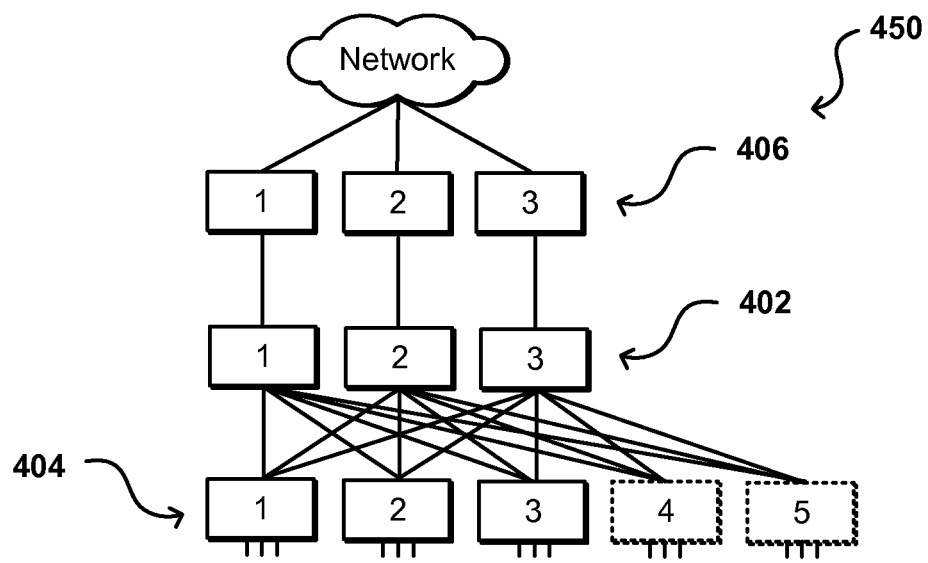

An approach in accordance with various embodiments can improve the efficiency of Clos-based data centers, making the networks more realistic in scale. The approach introduces oversubscription between the spine switches and the egress switches, such as is shown in the configuration 450 of FIG. 4(b). In this example, the number of "up" connections between the tier 2 spine switches 402 and the tier 1 egress switches 406 is reduced, with each spine switch 402 only being connected to one respective egress switch 406. In other embodiments, each spine switch can be connected to less than the total number of egress switches, etc. By reducing the number of connections up to the egress switches, each spine switch will have one or more open ports (two available ports in this example) that can be used to make "down" connections to additional tier 1 edge switches 404, each of which will have additional host connections 452 available for connecting additional host machines or other such devices. By introducing 5:1 oversubscription in the example (with each spine switch having one connection to the egress switch stage and five connections to the edge switch stage) the number of host connections has increased on the order of 60% while only increasing the cost of the network by about 10% due to the cost for additional devices. The efficiency of the network thus has increased accordingly. Such a design also can be recursed to develop larger networks, such as a four-tier network with the same or similar design principles.

An approach in accordance with various embodiments can provide for incremental scaling of switch networks in a network environment, such as a data center, which can utilize a configuration 200 as illustrated in FIG. 2, for example. This approach can be tier-independent. For example, consider a network such as can be seen in configuration 300 of FIG. 3. Each switch may have a number of ports, such as 24 ports. The number of ports a switch may have can vary. Some switches may have 48 ports for example. These approaches will generally scale mathematically based on the number of ports. Configuration 300 shows an example where these tiers of switches are fully connected. Configuration 300 may be described as two tier Clos network, with 24 port switches in this example, which has 12 spine switches and 24 edge switches with one connection between each spine switch and each edge switch. In some cases, configuration 300 may be deployed as shown. However, as discussed below, embodiments may include approaches for incrementally deploying and connecting the switches in accordance with various embodiments.

Similarly, configuration 350 shows an example that has 21 edge switches connected to hosts, and 12 spine switches connected with the 21 edge switches. In this example, connections that are not made between edge and spine switches may be used to make connections up to, for example, a crossbar architecture. As in a Clos network design, tier 1 switches, the edge switches in this example, can be fully connected to all tier 2 switches, the spine switches in this example. Configuration 350 shows an example where each spine switch is connected with each egress switch. In some cases, spine switches may be connected with cross bar switches using triple connections (not shown), where each spine switch makes three connections to the corresponding switch in the crossbar.

Normally in a Clos network topology, all the switches in a tier 2, for example, would be acquired up front in order to be prepared for the expected growth. For example, in configuration 300 and 350, the twelve switches in a tier would be acquired at one time. High radix networks, in general, design for the maximum capacity, and all the equipment such as the switches for different tiers is bought up front. And while only a few hosts may be connected with the edge or leaf layer at a time, extra switches are typically purchased and integrated up front even if they are not necessary at the time of installation.

At the data center level, this can involve thousands of devices and connections along with their associated cost.

An approach in accordance with various embodiments may result in configurations such as configuration 300 and/or 350. Other configurations such as configuration 400 of FIG. 4(a) and/or configuration 450 of FIG. 4(b) could also be realized in some embodiments, for example. The switches for one or more of the tiers may be incrementally scaled up to result in such configurations. Embodiments may utilize approaches that connect initial sets of switches between two tiers using two or more connections between each of the switches in the different tiers or sets. As additional switches may be added to different tiers or sets of switches, the extra connections between switches may be disconnected and reconnected to the incrementally added switches. This approach can be applied recursively. For example, at first, a small capacity at each tier may be built, and at some later point, the size or number of devices at the next tier may be increased. The incremental scaling can happen for different tiers also. For example, incremental scaling may occur between tiers 1 and 2. When capacity is reached in tier 2, a similar approach between tier 2 and 3 and even other tiers may be employed, for example.

This process of setting up multiple connections between respective switches in different tiers may be referred to as making redundant connections between tiers where the extra capacity resides. For example, when there are two tiers or sets of switches, each switch in one tier may have redundant connections made with each switch in the other tier. At some point, there may be no more capacity because all the ports of one of the tiers may be in use, such as the second tier. If there are redundant connections between tiers, the network may be expanded to accommodate additional switches to provide more ports.

Figure 5A:
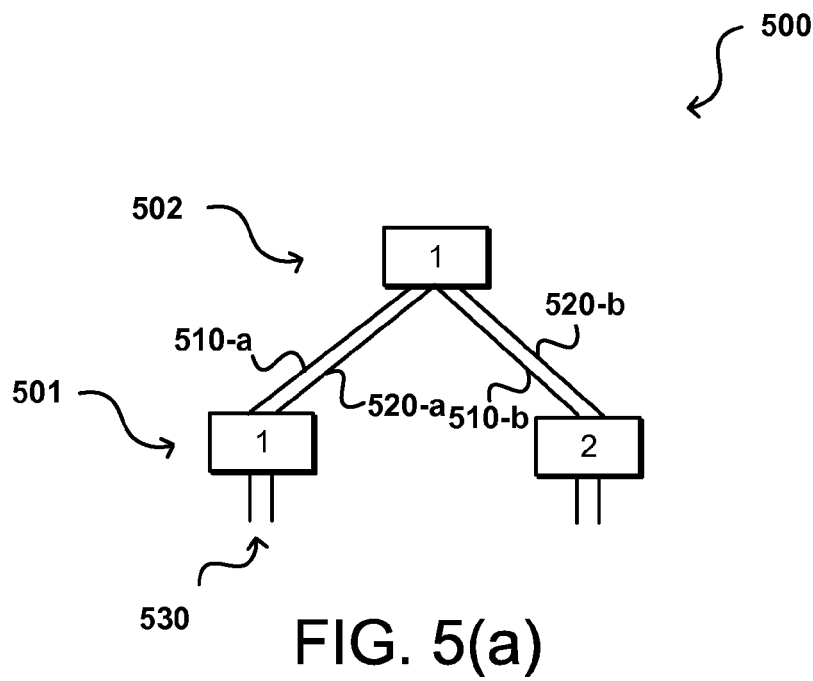
FIGS. 5(a) and 5(b) illustrate switch networks configured for incremental scaling in accordance with various embodiments.
Figure 5B:

FIGS. 5(a) and 5(b) illustrate an approach for incremental scaling in accordance with various embodiments. For this example, each switch has four ports, though the switches may have additional ports in some cases. FIG. 5A shows a configuration 500, with one switch in a second tier 502 and two switches in a first tier 501. For this example, the first tier 501 is not oversubscribed, where two ports from each switch may be used to connect with other devices below 530, and two connections (510-a/520-a from switch 1 of the first tier 501; 510-b/520-b from switch 2 of the first tier 501) may be connected up to the switches of the second tier 502. In order to add more capacity in the first tier, additional capacity can be added in the second tier 502. FIG. 5(b) shows a configuration 550 with additional switches added to each tier and then connected utilizing the redundant connections set up in configuration 500. A switch 2 has been added to the second tier 502 and a switch 3 and switch 4 have been added to the first tier 501. In order to get full connectivity, one of the connections 520-a from switch 1 of the first tier 501 to switch 1 of the second tier 502 can be disconnected and reconnected to switch 2 of the second tier 502. Similarly, from switch 2 of the first tier 501, connection 520-b can be disconnected and then reconnected with switch 2 of the second tier 502. In this example, 1:1 subscription at the first tier 501 is maintained. In disconnecting and reconnecting the connections 520-a and 520-b, ports become available on switch 1 of the second tier 502, such that additional switches 3 and 4 may be added to the first tier 501, and then connected 540 with both switch 1 and switch 2 of the second tier 502. In this case, the maximum-sized Clos network using 4-port switches is reached. The number of switches in each tier ends up being doubled, which is made possible in part because configuration 500 was set up with two connections between each switch of the first tier 501 and each switch of the second tier 502.

Figure 6A:
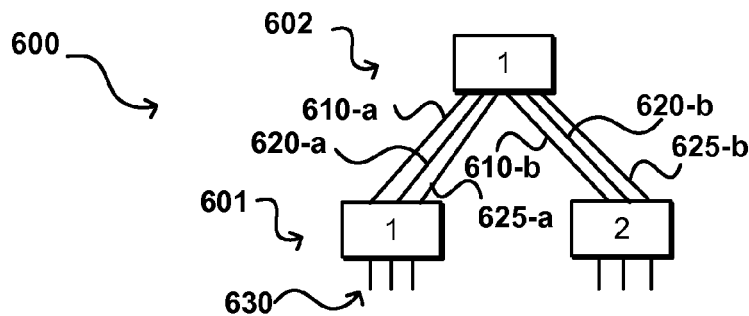
FIGS. 6(a), 6(b), and 6(c) illustrate switch networks configured for incremental scaling in accordance with various embodiments.
Figure 6B:
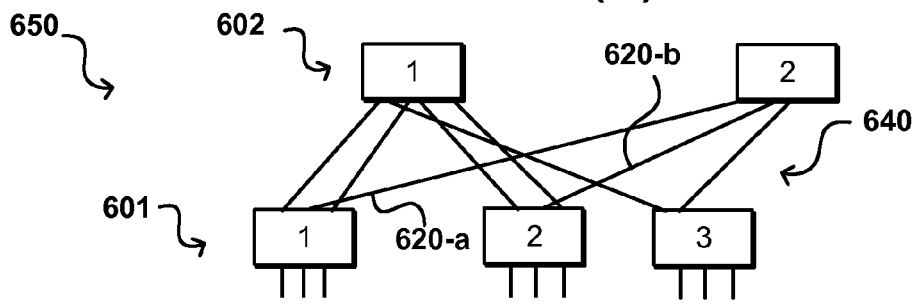
Figure 6C:
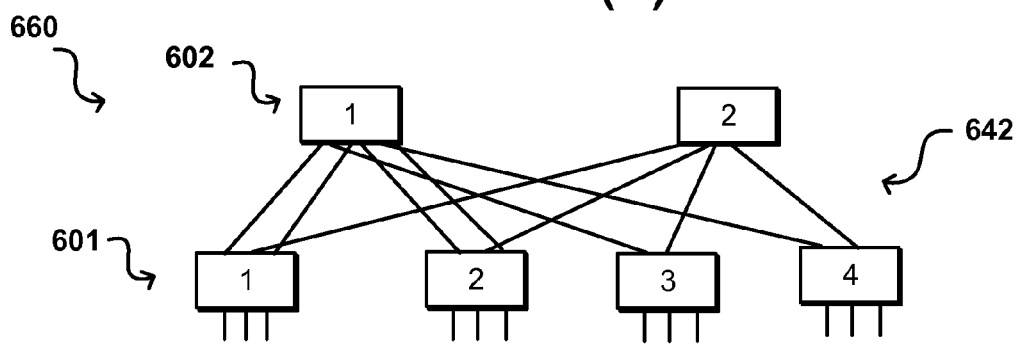
Figure 6D:
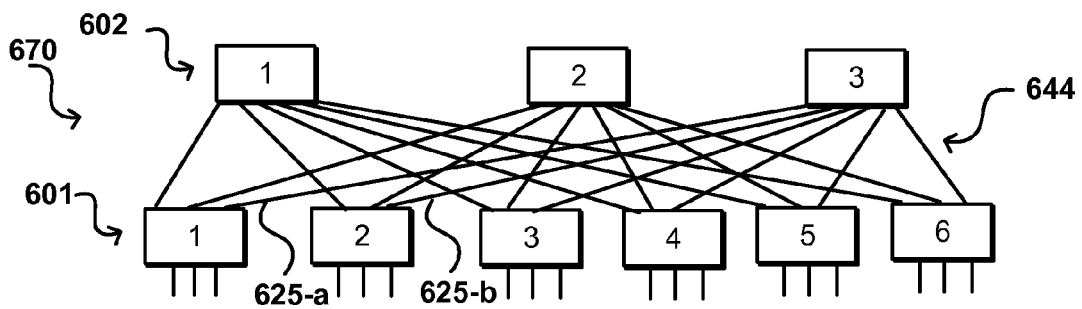

FIGS. 6(a), 6(b), 6(c), and 6(d) show a similar approach for incremental scaling utilizing 6-port switches that can be used in accordance with at least one embodiment. FIG. 6(a) shows an example configuration 600 with a second tier 602 initially with a switch 1 and a first tier 601 with a switch 1 and switch 2. Each switch of the second tier 602 can be connected with the switch of the second tier 602 utilizing 3 connections (610-a/620-a/625-a from switch 1 of the first tier 601; 610-b/620-b/625-b from switch 2 of the first tier 601). FIGS. 6(b), 6(c), and 6(d) show several stages of incrementally increasing the number of switches in the tiers and an approach for connecting the additional switches. FIG. 6(b) shows a configuration 660 with an additional switch 2 that is added to the second tier 602. The two original switches of the first tier 601 can then be connected to the additional switch 2 of the second tier 602 utilizing one of the additional connections each switch had with switch 1 of the second tier 602, connections 620-a and 620-b for example. In addition, FIG. 6(b) shows an additional switch 3 added to the first tier 601, which may be connected 640 with both switches in second tier 602. In this case, connecting switch 3 of the first tier 601 to switch 1 of the second tier 602 can utilize a port that has been opened up because of the connection that has between switched over to switch 2 of the second tier 602. FIG. 6(c) then shows a configuration 670 with the additional of a switch 4 to the first tier 601 and it being connected 642 to the two switches of the second tier 602, which again may can utilize ports opened up on switch 1 of the second tier 602 from the processing of disconnecting one of the connections between a switch of first tier 601 and switch 1 of the second tier 602 and then reconnecting the connection with switch 2 of the second tier 602. FIG. 6(d) ends up showing the additional of a third switch to the second tier 602, with the remaining additional connections between the original switches of the first tier 601 and switch 1 of the second tier 602 being moved over to the additional switch 3 of the second tier 602, connections 625-a and 625-b in this case. Again, with ports opening up on switch 1 of the second tier 602, additional switches 5 and 6 may be added to the first tier 601 and connected 644 with each of the 3 switches of the second tier 602. In this example, the number of switches has incrementally been tripled from the original set of switches as seen in FIG. 6(a).

FIG. 5 and FIG. 6, along with FIG. 7 and FIG. 8 below, provide examples of incremental scaling in accordance with various embodiments. The number of ports on any given switch and the number of multiple connections made between switches in different tiers may vary. In some cases, switches may be oversubscribed or undersubscribed. In addition, while these examples show connections between a first tier and a second tier, some embodiments may include additional tiers that may be connected with either the first and/or second tiers. Incremental scaling may be utilized to connect these additional tiers of switches to the other tiers of switches also. In some cases, these connections may utilize available ports from switches in a given a tier. In some embodiments, switches between tiers may be connected with multiple connections, while other switches may be connected utilizing individual connections.

Figure 7A:
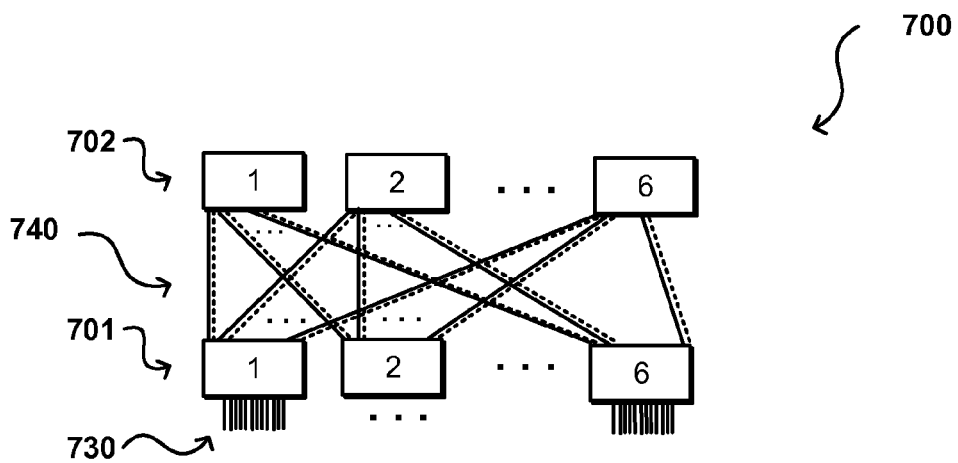
FIGS. 7(a), 7(b), and 7(c) illustrate switch networks configured for incremental scaling in accordance with various embodiments.
Figure 7B:
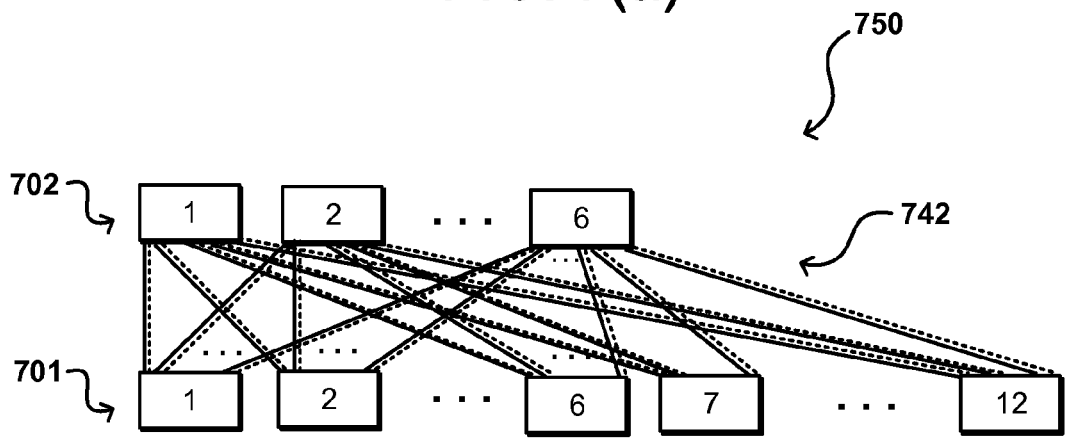
Figure 7C:
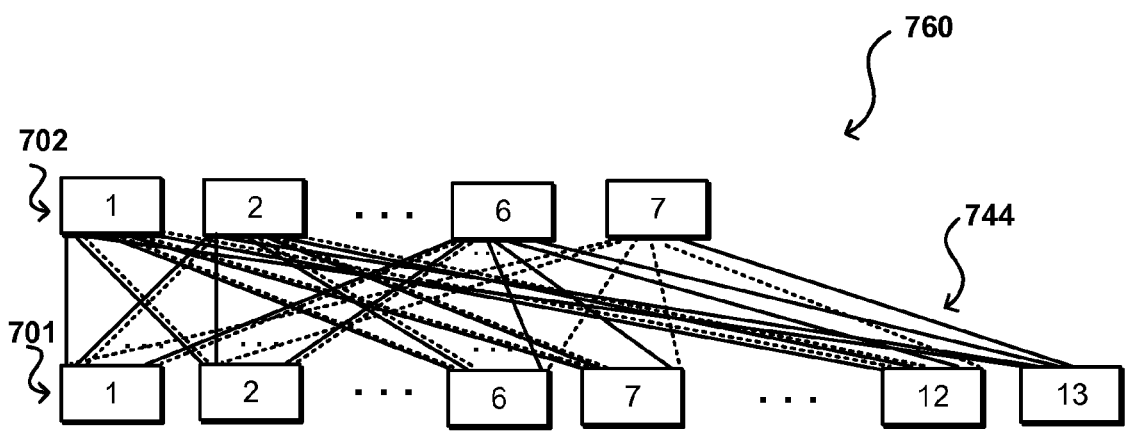
Figure 8A:
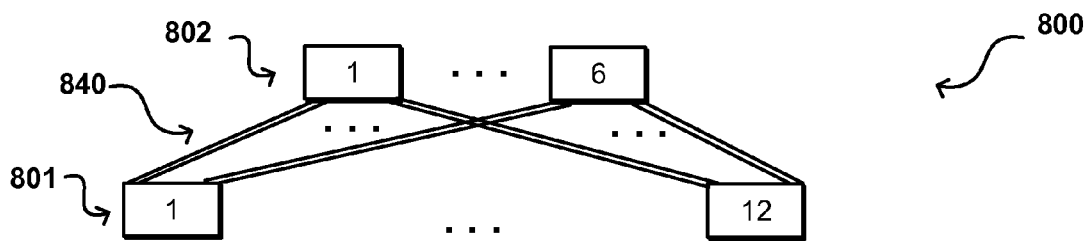
FIGS. 8(a), 8(b), 8(c), and 8(d) illustrate switch networks configured for incremental scaling in accordance with various embodiments.
Figure 8B:
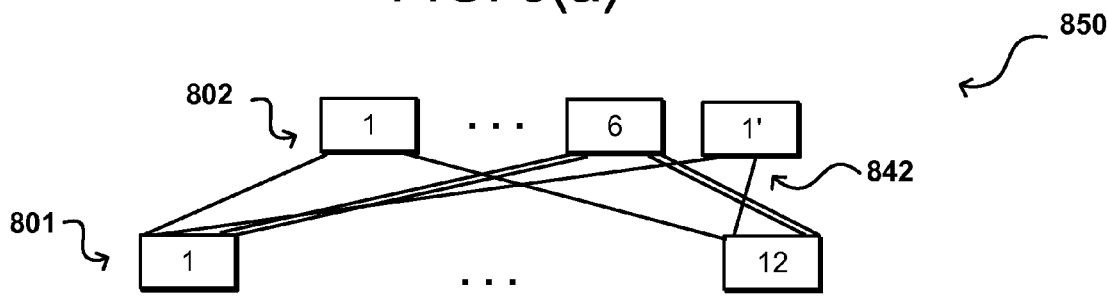
Figure 8C:
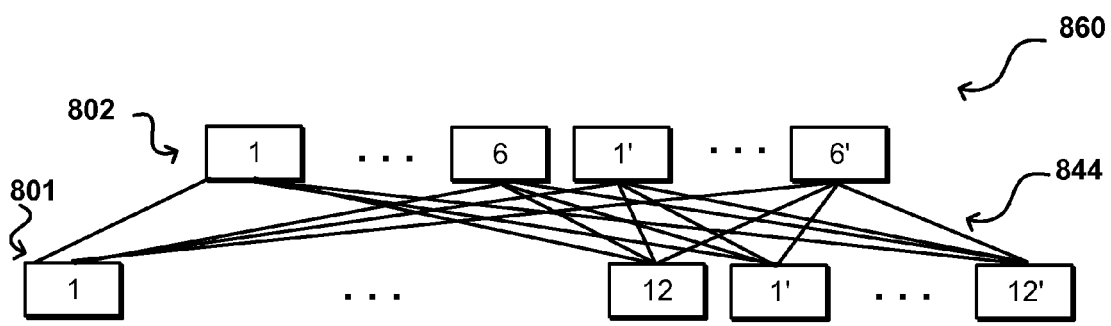
Figure 8D:
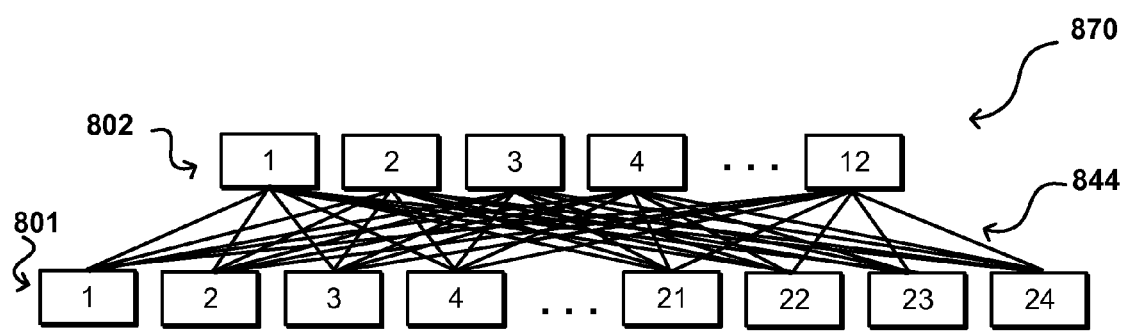

FIGS. 7(a), 7(b) and 7(c) show another similar approach for incremental scaling utilizing 24-port switches in accordance with various embodiments. FIG. 7(a) illustrates a configuration 700 with a second tier 702 initially with 6 switches and a first tier 701 also with six switches. Each switch of the first tier 701 is connected with each switch of the second tier 702 utilizing 2 connections, the two connections between each switch represented by a solid line and a dashed line. Each switch of both the first tier 701 and the second tier 702 each have twelve additional ports. The switches of the first tier in this case may be connected 730 with twelve other devices, such as host devices. In some cases, these ports may be coupled with another tier of switches. FIGS. 7(*b*) and 7(*c*) then show several stages of incrementally increasing the number of switches in the tiers and an approach for connecting the additional switches. FIG. 7(*b*) illustrates a configuration 750 with additional switches added to the first tier 701, in this case, six switches. Because the switches in the second tier still have open ports, each additional switch in the first tier 701 may be connected 742 with each switch in of the second tier 702 utilizing two connections between each switch. At this point, there may be no more ports available with the switches of the second tier 702, thus no additional connections may be made. FIG. 7(*c*) shows a configuration 760 where additional switches may be added to the first tier 701 and the second tier 702 at this point utilizing the fact that switches between the two tiers have been doubly connected. For example, a switch may be added to the second tier 702, where the switch is labeled switch 7 in this case. One of the connections between each switch in the first tier 701 may be disconnected from a corresponding switch in the second tier 702 and reconnected to the added switch 7 of the second tier 702; these connections are represented by the dashed connections connected with switch 7 of the second tier 702. This may be done sequentially to minimize the bandwidth impact during this scaling process. As a result of shifting these connections, ports have been made available for switches 1 to 6 in the second tier 702. Additional switches, such as switch 13 in the first tier 701 may thus be added and connected 744 with each switch 1 to 7 in of the second tier 702.

FIGS. 8(*a*), 8(*b*), 8(*c*), and 8(*d*) provide another example of incremental scaling in accordance with various embodiments. For this example, again 24 port switches are being utilized. FIG. 8(*a*) illustrates a configuration 800 with a first tier of switches 801 with twelve switches and a second tier 802 with 6 switches, where switches between each tier have been connected utilizing double connections. This is similar to what is seen in FIG. 7(*b*). FIG. 8(*b*) shows a configuration 850 with the addition of a switch 1' into the second tier 801. Switch 1' of the second tier 801 can be connected 842 to each switch of the first tier 801 utilizing one of the extra connections between each switch 1 to switch 6 of the second tier 802 and switch 1 to switch 12 of the first tier 801. FIG. 8(*c*) shows a configuration 860 that illustrates this process of adding switches to the tiers and disconnecting extra connections between the original switches of the first tier 801 and second tier 802 and reconnecting 844 to the added switches in the second tier 802. In addition, additional switches 1' to switch 12' may be added to the first tier 801 and connected with the switches of the second tier 802, in part utilizing the ports that have been opened on switches 1 to switch 6 of the second tier 802. FIG. 8(*d*) shows a configuration 870 that is similar to configuration 860 seen in FIG. 8(*c*), merely with some of the switches being renumbered to represent some of the unrepresented switches from the earlier FIG. 8.

The above configurations generally involve redundant connections between respective switches in different tiers. The redundant connections from a given switch in a second tier, for example, can generally be moved to an added switch in that same tier. In some embodiments, each redundant cable or connection can moved to a respective one of the added switches, such that only every other cable needs to be moved, while allowing for the additional bandwidth when there are less than all devices. This process of disconnecting and reconnecting, or moving connections, can be replicated for each redundant connection, such that each switch of a tier such as the first tier can still be connected to each switch of a second tier.

The process of incremental scaling can be done while the network is still actively serving network traffic if there is still at least one connection between each of the relevant switches when a redundant connection is moved to another switch. The switch network can dynamically route traffic around temporarily disconnected cables to accommodate this process of incremental scaling. The network can figure out that the interface is dead when a redundant cable is disconnected; the network can avoid routing any traffic through that interface while the redundant cable is disconnected. As new switches are added, the same thing happens and the network dynamically can pick up the additional interfaces. This provides an easy incremental strategy, which can be done several times.

The properties of incremental scaling in accordance with various embodiments allow for a variety of advantages. For example, embodiments may utilize switches with a fixed size or number of ports, along with being small component switches. These components may not be expensive or difficult to configure. In addition, moving one connection at a time can be on the level of noise for a large data center regarding temporary unavailability in a network still serving traffic. In some cases, the configuration can be static and the topology can be regular.

Incremental scaling may provide additional advantages. Switch networks in a data center may start small and allow for expansion, which may be planned in some cases. By planning for incremental scaling, infrastructure may be planned out ahead of time without necessarily having to provide all the network switches initially. In addition, trunk lines may be precabled for maximum capacity. Furthermore, trunk lines do not have to patch into each network switch. Incremental scaling may also avoid needing to reconfigure a network's configuration, code, and/or policy.

Switch networks built from the incremental scaling process in accordance with various embodiments can allow for regular network topology with well-defined tiers and well-defined interfaces between the various tiers. Incremental scaling can also utilize fixed, physical configurations. Embodiments may also utilize numerous smaller switches as opposed to a few large devices.

In some cases, the process of incremental scaling may allow for recabling while maximizing bandwidth for available capacity. In some cases, it also may be possible to calculate how much it will cost to recable for adding each switch. Capacity can be increased using incremental scaling based on when the increased capacity is needed. This can significantly reduce the cost impact of using Clos-based, high radix or other fat tree networks. Further, incremental scaling can help avoid the purchasing of expensive, rapidly depreciating assets that will not be well utilized.

In some cases, doubling capacity during a given stage of scaling up a data center might make sense for purposes of efficiency. However, when the number of devices may increase significantly, it may make sense to only add the necessary number of devices at that time. Furthermore, with incremental scaling, it may not matter how many tiers exist in a system; thus the processes discussed can be applied to all tiers. Tiers may also be added incrementally in some embodiments.

Some embodiments may also utilize IP-unnumbered configurations or interfaces, where none of those links have static addresses. IP-unnumbered interfaces may prevent the need to re-address the connections when moving cables. So when a cable connection is disconnected from one switch and reconnected to anther switch, the address of where the cable is reconnected may be automatically provided. There may be no need for someone to log in and reconfigure the switch or port as a result. This may also help avoid potential errors when humans reconfigure manually.

Figure 9:
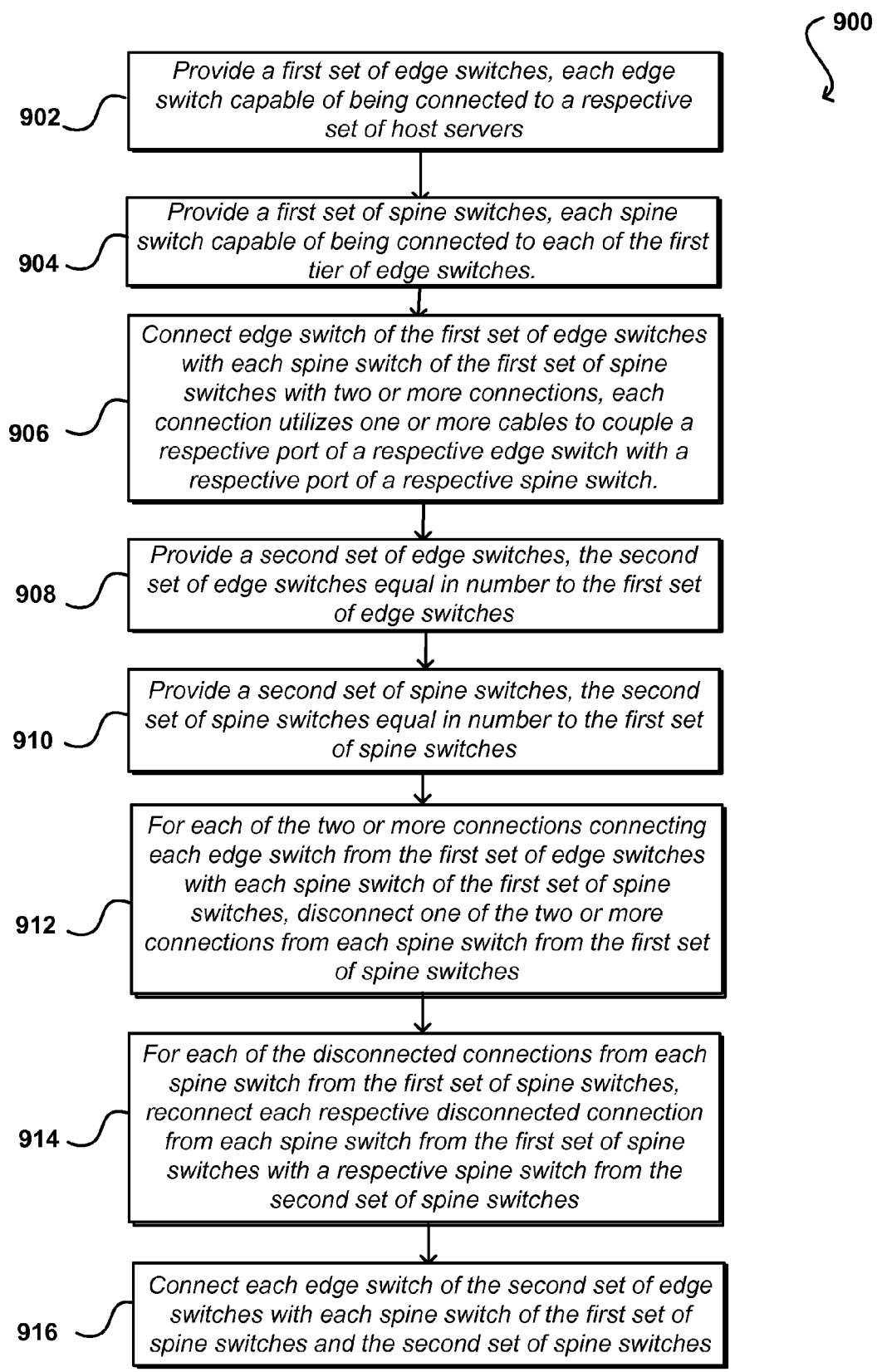
FIG. 9 illustrates an example process for implementing incremental scaling in accordance with various embodiments.

FIG. 9 illustrates another example process 900 for incremental scaling switches in a data center in accordance with one embodiment. In this example, a first set of edge switches are provided 902, where each edge switch is capable of being connected to a respective set of host machines. A first set of spine switches are also provided 904, where each spine switch is capable of being connected to each of the first tier of edge switches. Each edge switch of the first set of edge switches is connected 906 with each spine switch of the first set of spine switches with two or more connections. Each connection utilizes one or more cables to couple a respective port of a respective edge switch with a respective port of a respective spine switch. A second set of edge switches is provided 908, where the second set of edge switches equal in number to the first set of edge switches. A second set of spine switches is provided 910, where the second set of spine switches equal in number to the first set of spine switches. For each of the two or more connections connecting each edge switch from the first set of edge switches with each spine switch of the first set of spine switches, one of the two or more connections is disconnected from each spine switch from the first set of spine switches 912. For each of the disconnected connections from each spine switch from the first set of spine switches, each respective disconnected connection from each spine switch is reconnected from the first set of spine switches with a respective spine switch from the second set of spine switches 914. Each edge switch of the second set of edge switches is connected with each spine switch of the first set of spine switches and the second set of spine switches 916.

In some embodiments, connecting each edge switch of the second set of edge switches with each spine switch of the first set of spine switches and the second set of spine switches results in a formation of a fully connected fat tree or Clos topology between the first set and the second set of edge switches and the first set and the second set of spine switches.

Figure 10:
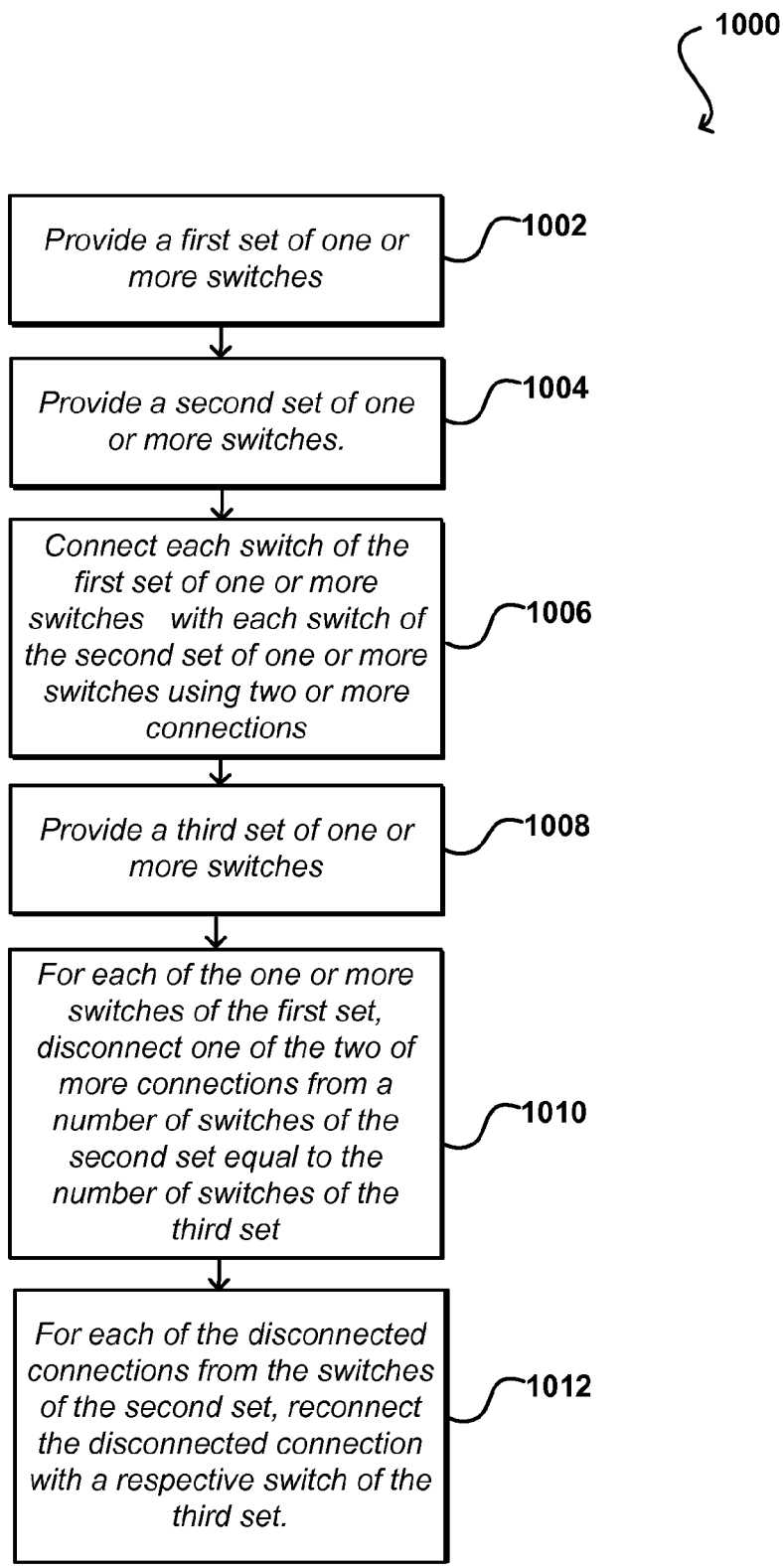
FIG. 10 illustrates an example process for implementing incremental scaling in accordance with various embodiments.

FIG. 10 illustrates another example process 1000 for incremental scaling switches in a data center in accordance with one embodiment. In this example, a first set of one or more switches is provided 1002. A second set of one or more switches is also provided 1004. Each of these sets of switches may be tiers of switches in some cases. In one embodiment, the first set of switches are edge switches and the second set of switches are spine switches. Each switch of the first set of one or more switches is connected with each switch of the second set of one or more switches using two or more connections 1006. A third set of one or more switches are provided 1008. For each of the one or more switches of the first set, one of the two of more connections is disconnected 1010 from a number of switches of the second set equal to the number of switches of the third set. For each of the disconnected connections from the switches of the second set, the disconnected connection is reconnected 1012 with a respective switch of the third set.

In some embodiments, a fourth set of one or more switches is provided. Each switch of the fourth set is connected with each switch of the second set of switches and the third set of switches. Connecting each switch of the fourth set with each switch of the second set and third set may form a Clos, fat tree or other high radix network topology.

The two or more connections between each switch of the first set and each switch of the second set may be configured with an IP-unnumbered configuration or interface in some cases. Disconnecting and reconnecting switches may be sequential in some cases, such that one connection is disconnected and then reconnected with another switch before the next connection is disconnected and then reconnected with another switch. In some cases, connecting each switch of the fourth set with each switch of the second set and the third set may involve connecting to a respective port of a respective switch of the second set made available when one of the two or more connections from each switch of the second set was disconnected.

Switches that may be utilized for any of the sets of switches may include commodity network switches and/or application-specific integrated circuits (ASIC). In some cases, the first set of switches may include top of rack (TOR) switches connected to multiple computing servers. In some cases, switches from the first and/or forth set may include spine switches; switches from the second and third sets may include cross-bar switches. In other cases, switches from the first and/or forth set may include edge switches; switches from the second and third sets may include spine switches. In some cases, the number of switches in the first and forth set may be equal to each other. The number of switches in the second set and third set may be equal to each other some cases.

Figure 11:
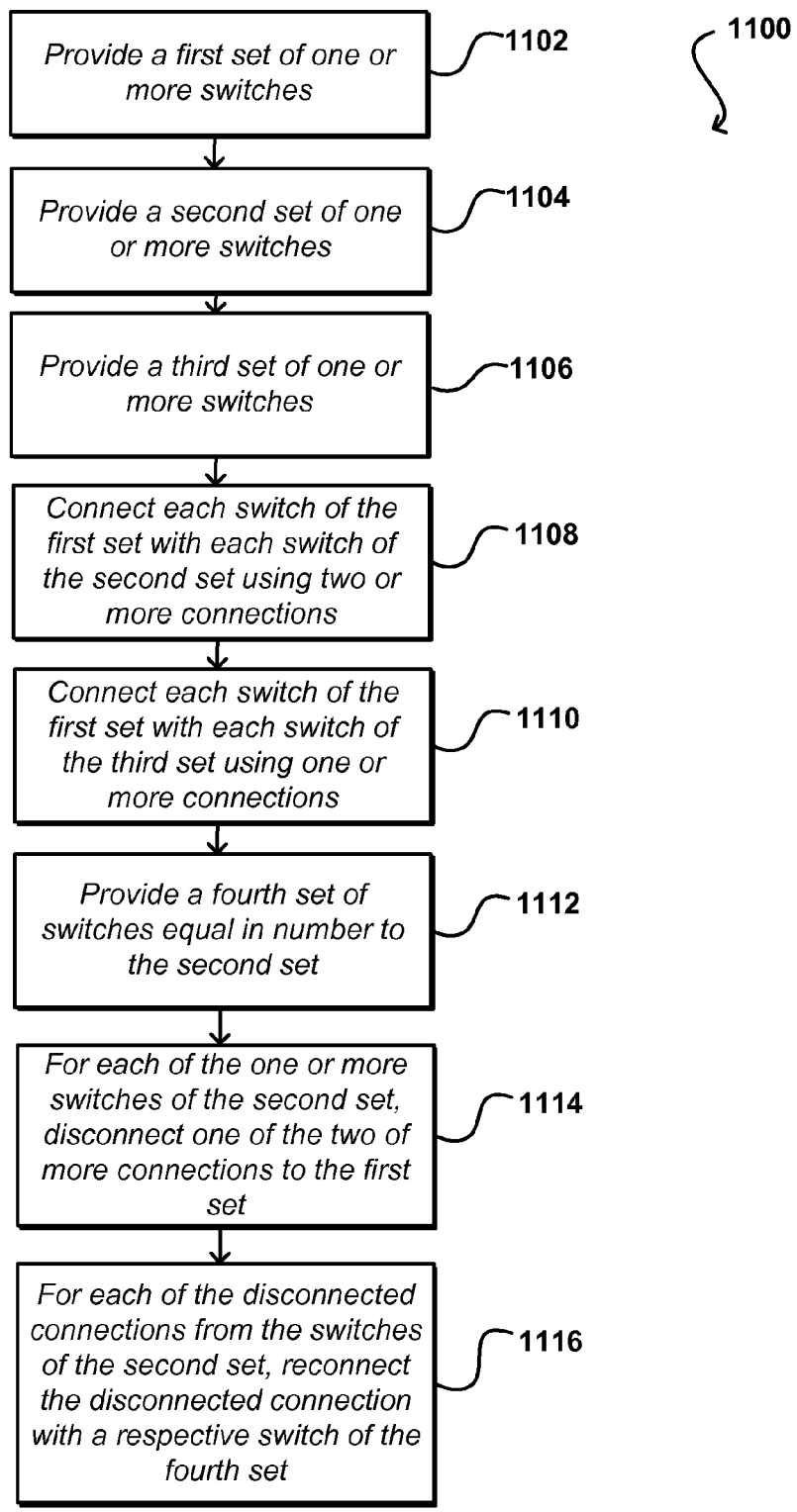
FIG. 11 illustrates an example process for implementing incremental scaling in accordance with various embodiments.

FIG. 11 illustrates another example process 1100 for incremental scaling switches in a data center in accordance with one embodiment. In this example, a first set of one or more switches is provided 1102. A second set of one or more switches 1104 and a third set of one or more switches are also provided 1106. Each switch of the first set is connected with each switch of the second set using two or more connections 1108. Each switch of the first set is connected with each switch of the third set using one or more connections 1110. A fourth set of switches equal in number to the second set is provided 1112. For each of the one or more switches of the second set, one of the two of more connections is disconnected to the first set 1114. For each of the disconnected connections from the switches of the second set, the disconnected connection is reconnected with a respective switch of the fourth set 1116.

In some embodiments, a fifth set of one or more switches are provided. Each switch of the fifth set may be connected with each switch of the second set, the third set, and the fourth set. Connecting each switch of the fifth set with each switch of the second set, third set, and fourth set can form a fat tree network topology with or without oversubscription between tiers. Thee fat tree network topology may be a re-arrangeably non-blocking network topology. The re-arrangeably non-blocking network may be a Clos network topology.

In some embodiments, the two or more connections between each switch of the first set and each switch of the second set are configured with an IP-unnumbered configuration. In some cases, one of the two of more connections may be disconnected from the second set sequentially and reconnecting with a respective switch of the fourth set occurs sequentially. One of the two of more connections from the number of switches of the second set may be disconnected from numbered port locations and reconnected with a respective switch of the fourth set occurs in an equivalent numbered port location.

In some embodiments, connecting each switch of the fifth set with each switch of the second set and the third set and the fourth set may include connecting to a respective port of a respective switch of the second set made available when one of the two or more connections from each switch of the second set was disconnected. Each of the switch of at least the first set, the second set, third set, fourth set, or fifth set may include a commodity network switch or application-specific integrated circuit (ASIC).

At least a portion of the first set of switches may be top of rack (TOR) switches connected to a multiple host computing devices in a server rack. The number of switches of the first set of switches may equal the number of switches in the fifth set in some cases. At least a portion of the second set of switches, the third set of switches, or the fourth set of switches may be spine switches in some embodiments. At least a portion of the first set or the fifth set of switches may be edge switches in some cases.

As discussed above, the various embodiments can be implemented in a wide variety of operating environments, which in some cases can include one or more user computers, computing devices, or processing devices which can be used to operate any of a number of applications. User or client devices can include any of a number of general purpose data center servers, workstations, personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of incremental scaling network switches in a data center, comprising:

providing a first set of edge switches, each edge switch capable of being connected to a respective set of host servers;

providing a first set of at least two spine switches, each spine switch of the first set of spine switches capable of being connected to each of the first set of edge switches;

connecting at least two ports of each edge switch of the first set of edge switches with at least two ports of each spine switch of the first set of spine switches, to yield connections, each connection utilizing a cable to couple a respective port of a respective edge switch with a respective port of a respective spine switch;

providing a second set of edge switches, the second set of edge switches equal in number to the first set of edge switches;

providing a second set of at least two spine switches, the second set of spine switches equal in number to the first set of spine switches;

for each of the connections connecting each edge switch from the first set of edge switches with each spine switch of the first set of spine switches, disconnecting one of the at least two connections from a corresponding port of each spine switch from the first set of spine switches;

for each of the disconnected connections from each spine switch from the first set of spine switches, reconnecting each respective disconnected connection from each spine switch from the first set of spine switches to a port of a respective spine switch from the second set of spine switches; and connecting a first port of each edge switch of the second set of edge switches to a first port of each spine switch of the first set of spine switches; and connecting a second port of each edge switch of the second set of edge switches to a second port of each spine switch of the second set of spine switches, wherein connecting each edge switch of the second set of edge switches with each spine switch of the first set of spine switches and the second set of spine switches results in a formation of at least one of i) a Clos network topology or ii) a fat tree network topology.

2. A method of incremental scaling switches in a data center, comprising:

providing a first set of spine switches;
providing a second set of edge switches;
providing a third set of spine switches;
connecting at least two ports of each spine switch of the first set with at least two ports of each edge switch of the second set;

connecting a port of each spine switch of the first set with at a port of each spine switch of the third set using connections;

providing a fourth set of edge switches equal in number to the third set;

for each of the edge switches of the second set, disconnecting a connection of the connections from a port of the first set, to yield disconnected connections comprising ports of the edge switches of the second set;

for each of the disconnected connections, reconnecting the ports of the edge switches of the second set to respective ports of the spine switches of the fourth set;

providing a fifth set of spine switches; and connecting a first port of each spine switch of the fifth set to a port of each edge switch of the second set;

connecting a second port of each spine switch of the fifth set to a port of each spine switch of the third set; and connecting a third port of each spine switch of the fifth set to a port of each edge switch of the fourth set, wherein connecting each spine switch of the fifth set with each switch of the second set, third set, and fourth set results in a formation of one at least one of i) a high radix network or ii) a fat tree network topology.

3. The method of claim 2, wherein the fat tree network topology is with or without oversubscription between tiers.

4. The method of claim 3, wherein the fat tree network topology is a re-arrangeably non-blocking network topology.

5. The method of claim 4, wherein the re-arrangeably non-blocking network is a Clos network topology.

6. The method of claim 2, wherein disconnecting one of the connections from the number of switches of the second set sequentially and reconnecting the disconnected connections with a respective switch of the fourth set occurs sequentially.

7. The method of claim 2, wherein disconnecting the connections from the number of switches of the second set from numbered port locations and reconnecting the disconnected connections with a respective switch of the fourth set occurs in an equivalent numbered port location.

8. The method of claim 2, wherein the connecting of each spine switch of the fifth set with ports in the second set, the third set, and the fourth set comprises connecting to a respective port of a respective switch of the second set made available when one of the connections from each switch of the second set was disconnected.

9. The method of claim 2, wherein each switch of the first set, the second set, third set, fourth set, or fifth set comprises a commodity network switch or application-specific integrated circuit (ASIC).

10. The method of claim 2, wherein a portion of the first set of switches are top of rack (TOR) switches connected to a plurality of host computing devices in a server rack.

11. The method of claim 2, wherein a number of switches of the first set of switches equals a number of switches in the fifth set.

12. The method of claim 2, wherein a portion of the second set of switches are spine switches.

13. The method of claim 2, wherein a portion of the third set of switches are edge switches.

14. The method of claim 2, wherein a portion of the fourth set of switches are spine switches.

15. The method of claim 2, wherein a portion of the first set of switches are edge switches.

16. The method of claim 2, wherein a portion of the fifth set of switches are edge switches.

17. A switch network in a data center comprising:

a first set of one or more switches, wherein each switch in the first set of one or more switches includes two or more ports, wherein the first set of one or more switches comprises spine switches;

a second set of one or more switches, wherein each switch in the second set of one or more switches includes two or more ports, and wherein two or more ports of each switch in the second set of one or more switches are connected with at least two or more ports of each switch of the first set of one or more switches, wherein the second set of one or more switches comprises edge switches;

a third set of one or more switches connected with each switch of the first set of one or more switches utilizing one of the ports of the two or more connections between a respective switch of the first set of switches and a respective switch of the second set of switches, wherein the one of the two or more connections is disconnected from the port of the respective switch of the second set of switches and reconnected with a port of the respective switch of the third set of switches, wherein the third set of one or more switches comprises spine switches; and
a fourth set of one or more switches connected with each switch of the second set of switches and the third set of switches, wherein at least one port of each switch in the fourth set is connected to a corresponding port of a switch of the second set, and wherein connecting the first set, second set, third set, and fourth set of switches results in the formation of at least one of i) a high radix network or ii) fat tree topology, wherein the fourth set of one or more switches comprises edge switches.

18. The method of claim 17, wherein the fat tree network topology is with or without oversubscription between tiers.

19. The method of claim 18, wherein the fat tree network topology is a re-arrangeably non-blocking network topology.

20. The switch network of claim 19, wherein the rearrangeably non-blocking network topology is a Clos network topology.

21. The switch network of claim 17, wherein the one of the two or more connections is disconnected from the respective switch of the second set and reconnected with the respective switch of the third set sequentially.

22. The switch network of claim 17, wherein the one of the two or more connections is disconnected from the respective switch of the second set and reconnected with the respective switch of the third set in an equivalent number port location.

23. The switch network of claim 17, wherein each of the switch of at least the first set, the second, set or the third set comprises a commodity network switch or application-specific integrated circuit (ASIC).

* * * * *